(12) United States Patent
Talwar et al.

(10) Patent No.: US 7,983,366 B2
(45) Date of Patent: Jul. 19, 2011

(54) TRANSMISSION SIGNALING TECHNIQUES TO ENHANCE RECEIVER INTERFERENCE MITIGATION PERFORMANCE

(75) Inventors: Shilpa Talwar, Santa Clara, CA (US); Nageen Himayat, Fremont, CA (US); Wan Choi, Austin, TX (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 961 days.

(21) Appl. No.: 11/567,004

(22) Filed: Dec. 5, 2006

(65) Prior Publication Data

US 2008/0130506 A1      Jun. 5, 2008

(51) Int. Cl.
*H03D 1/04* (2006.01)
(52) U.S. Cl. .................... 375/346; 375/349; 375/299
(58) Field of Classification Search .............. 375/267, 375/299, 295, 346–349, 260
See application file for complete search history.

(56) References Cited

U.S. PATENT DOCUMENTS

| | | | |
|---|---|---|---|
| 6,587,526 B1 | 7/2003 | Li et al. | |
| 7,551,701 B1 * | 6/2009 | Ariyavisitakul et al. | 375/350 |
| 7,643,589 B2 * | 1/2010 | Calderbank et al. | 375/347 |
| 2003/0043929 A1 * | 3/2003 | Sampath | 375/267 |
| 2004/0190636 A1 * | 9/2004 | Oprea | 375/260 |
| 2006/0093065 A1 * | 5/2006 | Thomas et al. | 375/299 |
| 2006/0209672 A1 * | 9/2006 | Tarokh et al. | 370/208 |
| 2006/0209749 A1 * | 9/2006 | Blanz et al. | 370/328 |
| 2006/0210004 A1 * | 9/2006 | Yellapantula et al. | 375/354 |
| 2006/0234646 A1 * | 10/2006 | Naguib et al. | 455/69 |
| 2007/0014272 A1 * | 1/2007 | Palanki et al. | 370/344 |
| 2007/0104283 A1 * | 5/2007 | Han et al. | 375/260 |
| 2007/0183533 A1 * | 8/2007 | Schmidl et al. | 375/299 |
| 2008/0013610 A1 * | 1/2008 | Varadarajan et al. | 375/221 |
| 2008/0049709 A1 * | 2/2008 | Pan et al. | 370/344 |
| 2008/0108310 A1 * | 5/2008 | Tong et al. | 455/69 |
| 2008/0260064 A1 * | 10/2008 | Shen et al. | 375/267 |
| 2009/0129502 A1 * | 5/2009 | Tong et al. | 375/299 |

FOREIGN PATENT DOCUMENTS

| | | |
|---|---|---|
| EP | 1195937 A1 | 4/2002 |
| RU | PCT/RU2005/000490 | 9/2005 |
| WO | 2008/070403 A1 | 6/2008 |

OTHER PUBLICATIONS

"Interface Resolving Technique for MB-OFDM Systems with UWB Channels", IEICE Trans Commun, vol. E89-B, No. 8, ISSN 0916-8516,(Aug. 2006), 2237-2240 pgs.
International Search Report and Written Opinion of the International Searching Authority; Dated Mar. 10, 2008; PCT/US2007/084244, (Mar. 10, 2008),10 pgs.

(Continued)

*Primary Examiner* — Emmanuel Bayard
(74) *Attorney, Agent, or Firm* — Cool Patent, P.C.; Joseph P. Curtin

(57) ABSTRACT

Techniques are described that can be used to maximize the interference suppression capability of space-time coded systems by managing synchronous transmission signaling. To enhance the probability of the occurrence synchronous interference and accordingly increase interference cancellation capability at a receiver, a network of at least two transmitters in a network may utilize similar structured coding schemes and coordinate transmission so that the receiver receives co-channel signals synchronously.

27 Claims, 4 Drawing Sheets

OTHER PUBLICATIONS

International Preliminary Report on Patentability Received for PCT Application No. PCT/US2007/084244, mailed on Jun. 18, 2009, 6 pages.

Alamouti, Siavash M., "A Simple Transmit Diversity Technique for Wireless Communications", IEEE Journal on Select Areas in Communications, vol. 16, No. 8, Oct. 1998, pp. 1451-1458.

Naguib, Ayman F. et al., Applications of Space-Time Block Codes and Interference Suppression for High Capacity and High Data Rate Wireless Systems, 1998 IEEE, pp. 1803-1810.

Tarokh, Vahid et al., "Space-Time Block Codes from Orthogonal Designs", IEEE Transaction on Information Theory, vol. 45, No. 5, Jul. 1999, pp. 1456-1467.

* cited by examiner

TRANSMISSION SIGNALING TECHNIQUES TO ENHANCE RECEIVER INTERFERENCE MITIGATION PERFORMANCE

FIELD

The subject matter disclosed herein relates to techniques to reduce interference from transmitted signals.

RELATED ART

Wireless communications systems are widely available. A receiver may be programmed to decode certain desired received signals from one or more transmitter. However, because multiple transmitters typically transmit simultaneously, the receiver may receive interfering signals received from one or more transmitter. Interference may reduce the likelihood that the receiver can accurately reproduce the desired received signals. It is desirable to shape transmissions in order to improve the likelihood that a receiver can accurately reproduce desired received signals.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
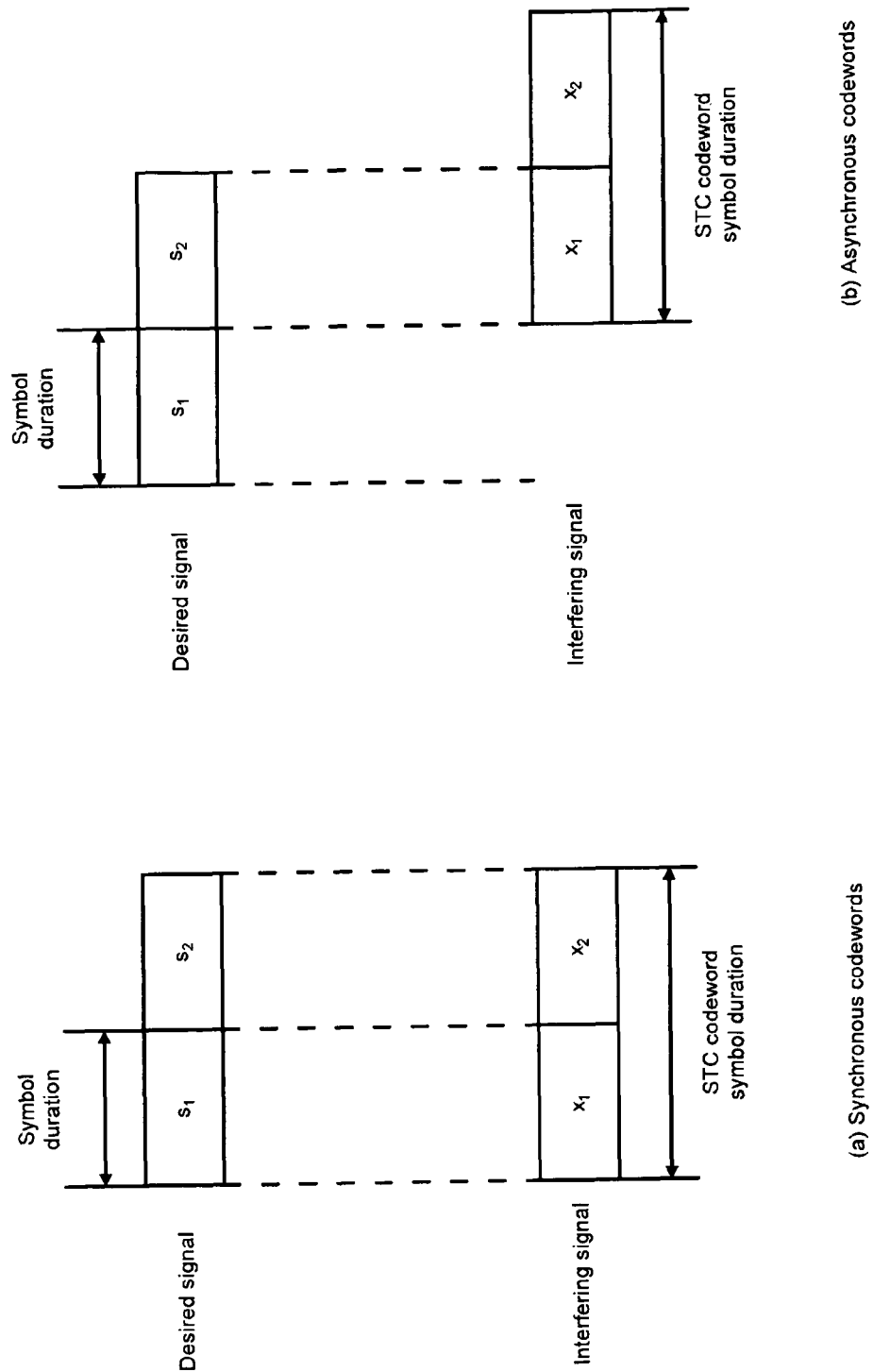
FIG. 1 depicts an example in which received space-time encoded code words from a desired transmitter and an interfering transmitter are either synchronous or asynchronous.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), ZigBee (TM), or the like. Embodiments of the invention may be used in various other apparatuses, devices, systems and/or networks.

Space-time coding (STC) is an efficient transmit diversity technique which has been proposed in many emerging standards such as but not limited to orthogonal frequency-division multiplexing (OFDM) and orthogonal frequency-division multiplexing multiple access (OFDMA). Examples of OFDM and OFDMA standards include but are not limited to: IEEE 802.16, IEEE 802.11, and 3GPP LTE and variations thereof. Block space-time codes are particularly attractive for practical systems because simple linear receivers can achieve spatial diversity order of the number of transmit antennae. In addition, these codes may allow use of simple interference suppression techniques.

The performance of linear receivers that use techniques such as but not limited to minimum mean square error based interference cancellation techniques (MMSE-IC) may be severely degraded if the receiver receives code-asynchronous interference. For example, FIG. 1 depicts an example in which received space-time encoded code words from the desired transmitter and the interfering transmitter are either code-synchronous or code-asynchronous. In the synchronous case, codeword symbols are aligned whereas in the asynchronous case, codeword symbols are mis-aligned by one or multiple symbol durations. Synchronous interference may be more desirable than asynchronous interference at least because synchronous interference may result in better receiver performance or may be more readily cancelled. In order to improve interference reduction by receivers using techniques such as but not limited to MMSE-IC, code-synchronous interference at a receiver may be more desirable than code-asynchronous interference.

To aid in understanding, the examples provided herein are described with respect to one interfering transmitter and one receiver, but techniques described herein can be extended to any number of interfering transmitters and any number of receivers.

Figure 2:
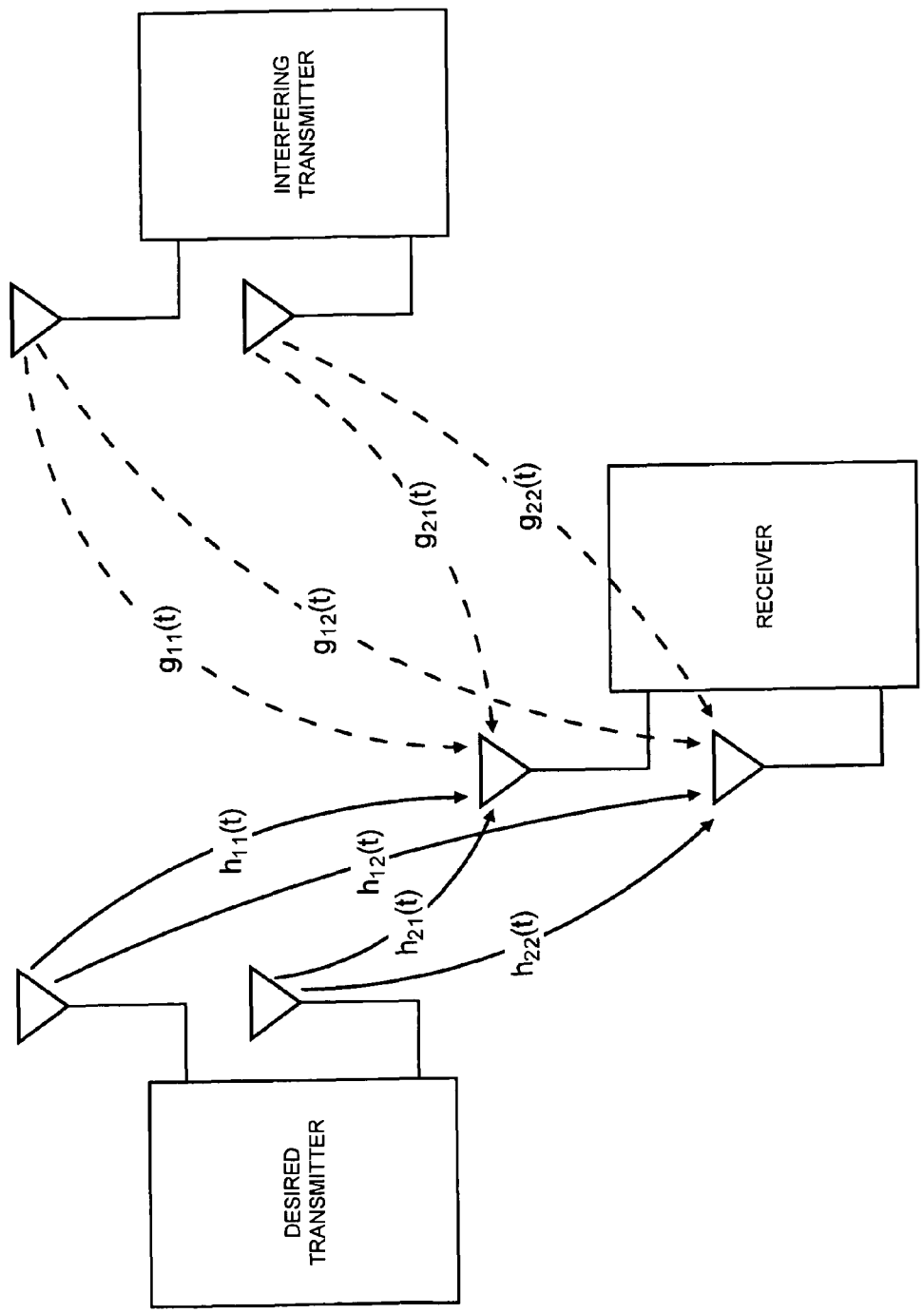
FIG. 2 depicts an example of a system with transmitters of desired and interfering signals.

FIG. 2 depicts an example of a system with transmitters of desired and interfering signals. In this example, each transmitter transmits 2×2 space-time codes. In FIG. 2, a receiver receives desired signals h(t) from a desired transmitter and interfering signals g(t) from an interfering transmitter. In the example of FIG. 2, each of the transmitters and the receiver use two antennae, although other numbers of antennae may be used.

The case of code-synchronous interference is first considered. The effective received signals can be represented by:

$$\begin{bmatrix} r_1 \\ r_2 \end{bmatrix} = \underbrace{\begin{bmatrix} H_1 \\ H_2 \end{bmatrix} \begin{bmatrix} s_1 \\ s_2 \end{bmatrix}}_{desired\ signal} + \underbrace{\begin{bmatrix} G_1 \\ G_2 \end{bmatrix} \begin{bmatrix} x_1 \\ x_2 \end{bmatrix}}_{interfering\ signal} + n \qquad (1)$$

where $H_i = \begin{bmatrix} h_{1i} & h_{2i} \\ h_{2i}^* & -h_{1i}^* \end{bmatrix}$ (if $H$ has an orthogonal property), $$G_i = \begin{bmatrix} g_{1i} & g_{2i} \\ g_{2i}^* & -g_{1i}^* \end{bmatrix},$$

$h_{ij}$ are channel gains between the ith receiver and the jth transmit antennas, and n is the additive white Gaussian noise (AWGN) with covariance matrix $\sigma^2 I$.

Applying the MMSE technique, the desired signals can be estimated by:

$$\begin{bmatrix} \hat{s}_1 \\ \hat{s}_2 \end{bmatrix} = H^H (HH^H + GG^H + \sigma^2 I)^{-1} \begin{bmatrix} r_1 \\ r_2 \end{bmatrix} \qquad (2)$$

where $H = \begin{bmatrix} H_1 \\ H_2 \end{bmatrix}$ and $G = \begin{bmatrix} G_1 \\ G_2 \end{bmatrix}$.

If H is an orthogonal property, the desired signals can be estimated as $$\begin{bmatrix} \hat{s}_1 \\ \hat{s}_2 \end{bmatrix} = H^H \begin{bmatrix} \alpha I & M \\ M^H & \beta I \end{bmatrix}^{-1} \begin{bmatrix} r_1 \\ r_2 \end{bmatrix} \qquad (3)$$

where $M = H_1 H_2^H + G_1 G_2^H$, $\alpha = (\|h_1\|^2 + \|g_1\|^2 + \sigma^2)I$, and $\beta = (\|h_2\|^2 + \|g_2\|^2 + \sigma^2)I$.

The vector $h_1$ and $g_1$ denote the ith column of H and G, respectively.

$$\text{Let } \begin{bmatrix} y_1 \\ y_2 \end{bmatrix} = \begin{bmatrix} \alpha I & M \\ M^H & \beta I \end{bmatrix}^{-1} \begin{bmatrix} r_1 \\ r_2 \end{bmatrix},$$

and this vector can be computed as $$y_2 = (M^H M - \alpha \beta I)^{-1} (M^H r_1 - \alpha r_2), \qquad (4)$$

$$y_1 = \frac{1}{\alpha}(r_1 - M y_2). \qquad (5)$$

Finally, the estimated desired signals given in (3) can be obtained by substituting equations (4) and (5).

An extension to a code-asynchronous case can be made. For the asynchronous case, the effective received signals can be given by $$\begin{bmatrix} r_1 \\ r_2 \end{bmatrix} = \underbrace{\begin{bmatrix} H_1 \\ H_2 \end{bmatrix} \begin{bmatrix} s_1 \\ s_2 \end{bmatrix}}_{desired\ signal} + \underbrace{\begin{bmatrix} G_1 \\ G_2 \end{bmatrix} \begin{bmatrix} x_1 \\ x_2 \\ x_3 \\ x_4 \end{bmatrix}}_{interfering\ signal} + n$$

where $H_i = \begin{bmatrix} h_{1i} & h_{2i} \\ h_{2i}^* & -h_{1i}^* \end{bmatrix}$ and $G_i = \begin{bmatrix} g_{2i}^* & -g_{1i}^* & 0 & 0 \\ 0 & 0 & g_{1i} & g_{2i} \end{bmatrix}$.

The estimated desired signals can be obtained by the same procedure as for the synchronous case.

When the code-words are synchronized, the receiver effectively experiences interference from one pair of interfering symbols. Thus a receiver with two receive antennas has sufficient extent of freedom to suppress the interference. When the interference is code-asynchronous then the receiver experiences interference from two interfering symbols and may not have sufficient degrees of freedom to suppress the interference. Hence, the interference suppression performance may degrade when interference is not symbol synchronized. For example, an example of degradation in the interference performance is illustrated by the following table describing the error in decoded symbols after interference suppression.

TABLE 1

MSE for synchronous and asynchronous cases (2 × 2)

| | Synchronous case | Asynchronous case |
| --- | --- | --- |
| Avg. MSE | 8e−32 | 0.041 |

Some embodiments of the present invention may increase the interference suppression capability of space-time coded OFDM(A) systems by managing code-synchronous transmission signaling. In some embodiments, to enhance the probability of the occurrence synchronous interference and accordingly increase interference cancellation capability at a receiver, a network of at least two transmitters in a cellular or other type of network may utilize similar structured coding schemes and coordinate transmission so that the receiver receives co-channel signals synchronously. In some embodiments, edge-of-cell users with a simple linear receiver may benefit from reduced interference.

For example, OFDMA signal framing is designed such that space-time or space-frequency code words span the same resources across the cellular network. For example, in an OFDMA frame with 6 data symbols, all cells in a network use the same symbol pairs for Alamouti space-time coding (e.g., (1,2), (3,4) and (5,6)).

Some embodiments of the present invention may increase the interference suppression capability of one or more receiver in a network by providing at least two transmitters in the network to use similar structured coding schemes such that one or more interfering signal preserve the same structure in time and frequency as the desired signal. If at least two transmitters in a network use similar structured coding schemes to transmit to a receiver in the network, the receiver may more effectively reduce interference from one or more interfering transmitter. Examples of structured coding schemes include but are not limited to space-time block coding, Alamouti space-time coding, and variations thereof.

In some embodiments, a receiver may receive co-channel signals approximately time-synchronously at least when the signals from co-channel interferers arrive at the receiver within the cyclic prefix (CP) duration of desired signal. In some embodiments, when the signals from co-channel interferers arrive at the receiver within the cyclic prefix (CP) duration of desired signal, the frequency orthogonality of the subcarriers in the desired and interfering signals may be preserved. All transmitters may maintain a similar CP duration. Cyclic prefix is a feature used at least by OFDM to combat the inter-symbol-interference (ISI) and inter-channel-interference (ICI) introduced by the multi-path channel through which the signal is propagated. The cyclic prefix may be implemented by replicating part of the OFDM time-domain waveform from the back of the waveform to the front of the waveform to create a guard period. The duration of the guard period may be longer than the worst-case delay spread of the target multi-path environment and the propagation delay of interference signal.

In some embodiments, coordination may take place among transmitters to achieve use of similar structured coding schemes and for the receiver to receive co-channel signals code-synchronously. For example, a network element (e.g., a radio resource manager) may be assigned to coordinate transmitters to achieve use of similar structured coding schemes and for the receiver to receive co-channel signals synchronously. For example, each transmitter can communicate with at least one other transmitter to achieve use of similar structured coding schemes. For example, in real time, a transmitter could communicate with at least one other transmitter to indicate use of a certain structured coding scheme. For example, a central transmitter may be assigned to communicate the coding scheme to use to transmitters in a network. Accordingly, other transmitters can utilize similar schemes. Transmitters may inter-communicate using wired or wireless techniques according to any standards.

For the receiver to receive co-channel signals time-synchronously, transmitters could coordinate to transmit symbols starting at some delay or advance (i.e., negative delay) value. One or more transmitter or other network element may intercommunicate with the receiver to determine whether the receiver receives co-channel signals time-synchronously based on the transmit delay scheme used.

Figure 3:
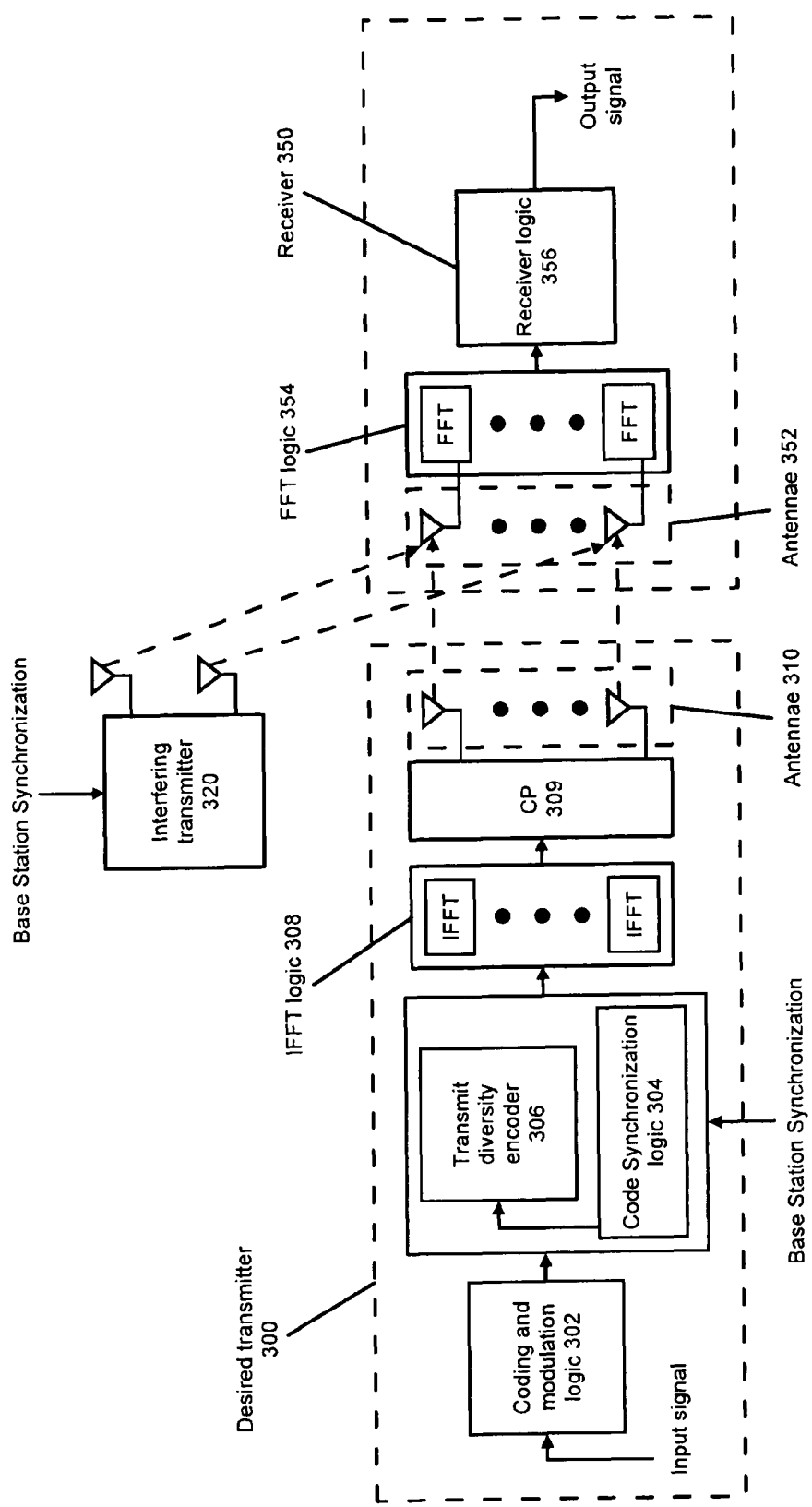
FIG. 3 depicts an example of a suitable system to reduce interference at a receiver, in accordance with some embodiments of the present invention.

FIG. 3 depicts an example of a system that can be used in some embodiments of the present invention. For example, the system may include desired transmitter 300, interfering transmitter 320, and receiver 350. Desired transmitter 300 may transmit signals that receiver 350 is programmed to decode whereas interfering transmitter 320 may transmit interfering signals. The system may utilize any wireless protocols.

Desired transmitter 300 may include coding and modulation logic 302, code synchronization logic 304, transmit diversity encoder logic 306, inverse fast fourier transform (IFFT) logic 308, cyclic prefix (CP) logic 309, and antennae 310. Coding and modulation logic 302 may receive an input signal that is to be transmitted to receiver 350. Coding and modulation logic 302 may apply any of forward error correction encoding, scrambling, convolution encoding, interleaving, mapping, and pilot and zero insertion. Any mapping schemes may be used such as but not limited to binary phase shift keying (BPSK), quadrature PSK (QPSK), and quadrature amplitude modulation (QAM), as well as variations thereof. Coding and modulation logic 302 may provide resulting signals to transmit diversity encoder 306.

Code synchronization logic 304 may be used to coordinate the transmission of similar structured coding schemes by transmitters 300 and 320 and the receipt of co-channel signals by receiver 350 from transmitters 300 and 320 in a code-synchronous manner.

Transmit diversity encoder logic 306 may apply the selected structured coding scheme on signals to be transmitted to a receiver to be used by multiple transmitters communicated using code synchronization logic 304. For example, transmit diversity encoder logic 306 may encode using techniques such as but not limited to space-time block coding, Alamouti space-time coding, and variations thereof. Transmit diversity encoder logic 306 may provide resulting signals to IFFT logic 308.

IFFT logic 308 may be logic capable to perform inverse fast fourier transforms of signals to be transmitted to receiver 350 IFFT logic 308 may operate in compliance with any applicable wireless standards. CP logic 309 may insert a CP in the signals to be transmitted in the time-domain signal. CP logic 309 may delay or advance in time one or more transmitted signal based on time-synchronous requirements at the receiver to ensure that the receiver receives interfering signals within a CP of desired signal. For example, one or more transmitter or other network element may intercommunicate with the receiver to determine whether the receiver receives co-channel signals time-synchronously based on the transmit delay scheme used. Antennae 310 may transmit signals to one or more receiver. Two or more antennae may be used.

Interfering transmitter 320 may be implemented in a similar manner as transmitter 300. For example, transmitter 320 may include the capability to adjust the utilized coding scheme to achieve code synchronization and/or delay or advance time to transmit codes based on communication with any of another transmitter, network element, and/or receiver.

Receiver 350 may include antennae 352, fast fourier transform (FFT) logic 354, receiver logic 356, and demodulation and detection logic 358. Antennae 352 may receive transmitted signals from one or more transmitter such as but not limited to transmitters 300 and 320. Two or more antennae may be used. Antennae 352 may transfer received signals to FFT logic 354.

FFT logic 354 may apply fast fourier transform techniques prescribed by any relevant standard. FFT logic 354 may provide resulting signals to receiver logic 356. Receiver logic 356 may perform any of synchronization, channel estimation and equalization, de-mapping, de-interleaving, and/or de-scrambling. Receiver logic 356 may use techniques such as but not limited to MMSE-IC to reduce affects of interference from one or more interfering transmitter. Techniques other than MMSE-IC can be used such as but not limited to zero-Forcing IC, maximum-likelihood based IC, and non-linear IC. Receiver logic 356 may provide an output signal to be used by any logic such as but not limited to a host computer. The host computer may include for example one or more central processing unit, a memory device, storage device, user interface. The host computer may further have access to a transmitter similar to transmitter 300 to transmit signals to one or more network element.

Figure 4:
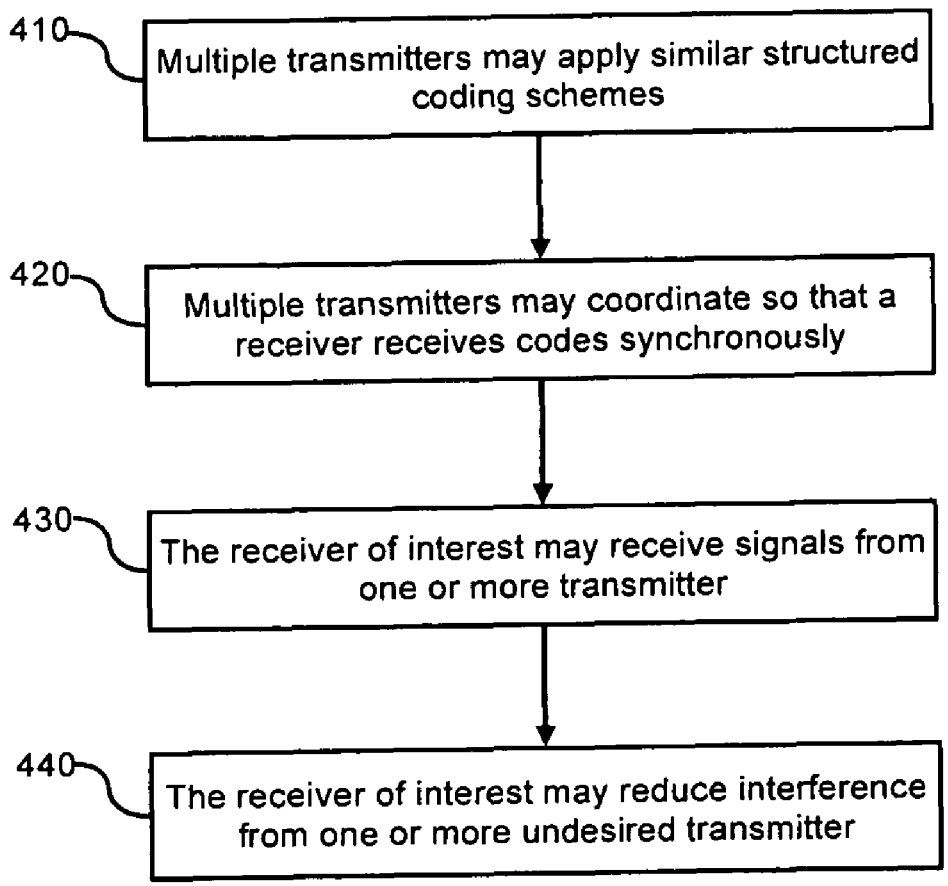
FIG. 4 depicts an example of a suitable process to reduce interference at a receiver, in accordance with some embodiments of the present invention.

FIG. 4 depicts an example process that can be used in some embodiments of the present invention to reduce interference from received signals. In block 410, multiple transmitters may apply similar structured coding schemes. For example, the structured coding scheme may be any of space-time block coding, Alamouti space-time coding, and variations thereof. For example, multiple transmitters may intercommunicate with each other or a central transmitter to determine the structured coding scheme to apply. For example, the structured coding scheme may be set in real-time or prior to a transmitter transmitting any data signal.

In block 420, multiple transmitters may coordinate so that a receiver receives codes time-synchronously. For example, the receiver may receive codes time-synchronously when the receiver receives codes within a cyclic prefix of each other. For example, multiple transmitters may apply a delay or advance to transmitted signals so that a receiver receives codes synchronously. For example, multiple transmitters may determine the delay based on communication with each other, with a central transmitter, and/or with a receiver of interest.

In block 430, the receiver of interest may receive signals from one or more transmitter.

In block 440, the receiver of interest may reduce interference from one or more undesired transmitter. For example the receiver of interest may apply MMSE-IC techniques to reduce interference. Techniques other than MMSE-IC can be used such as but not limited to zero-Forcing IC, maximum-likelihood based IC, and non-linear IC.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system, comprising:
a network comprising at least two transmitters;
a receiver in the network capable of receiving a desired signal transmitted from a first transmitter of the network and an undesired signal transmitted from a transmitter of the network other than the first transmitter, the receiver further capable of reducing interference between the desired signal and the undesired signal; and
logic capable of coordinating the first transmitter and the transmitter other than the first transmitter to use similar space-time coding schemes, and capable of synchronizing receipt by the receiver of codes of the similar space-time coding schemes of the desired signal and the undesired signal.

2. The system of claim 1, wherein the receiver is further capable of using a mean-square-error-based interference cancellation technique to reduce interference between the desired signal and the undesired signal.

3. The system of claim 1, wherein similar space-time coding schemes comprise schemes with similar symbol order, time and frequency.

4. The system of claim 1, wherein similar space-time coding schemes comprise space-time coding schemes selected from a group consisting of space-time block coding and Alamouti space-time coding.

5. The system of claim 1, wherein synchronizing receipt by the receiver of codes of the similar space-time coding schemes of the desired signal and the undesired signal comprises coordinating transmission by the first transmitter and the transmitter other than the first transmitter so that the receiver receives codes of the undesired signal within a cyclic prefix duration of the desired signal.

6. The system of claim 1, wherein the logic capable of coordinating is further capable of prescribing a delay or an advance to the first transmitter and to the transmitter other than the first transmitter so that the receiver synchronously receives codes of the desired signal and the undesired signal.

7. The system of claim 6, wherein the first transmitter and the transmitter other than the first transmitter each comprise:
coding and modulation logic capable of receiving an input signal and performing on the input signal at least one task selected from a group consisting of: forward error correction encoding, scrambling, convolution encoding, interleaving, mapping, and pilot and zero insertion;
synchronization logic capable of receiving an indication of the similar space-time coding scheme;
a transmit diversity encoder capable of applying a similar space-time coding scheme on signals provided from the coding and modulation logic;
inverse fast Fourier transform logic capable of performing an inverse fast Fourier transform on signals provided from the transmit diversity encoder;
cyclic prefix logic capable of applying a prescribed delay or a prescribed advance to signals provided from the inverse fast Fourier transform logic; and
at least two antennae capable of transmitting to the receiver signals provided from the inverse fast Fourier transform logic.

8. The system of claim 6, wherein the receiver comprises:
at least two antennae capable of receiving signals from the first transmitter and the transmitter other than the first transmitter;

fast Fourier transform logic capable of performing a fast Fourier transform on signals provided from the antennae; and receiver logic capable of applying mean square error based interference cancellation techniques to reduce interference in signals provided by the fast Fourier transform logic.

9. The system of claim 6, wherein the logic capable of coordinating the first transmitter and the transmitter other than the first transmitter comprises a transmitter in the network.

10. A method, comprising:
notifying a first transmitter in a network and another transmitter in the network of a structured coding scheme that each notified transmitter is to use for transmission of signals and of a prescribed delay or a prescribed advance, the first transmitter transmitting a desired signal to a receiver and the another transmitter transmitting an undesired signal to the receiver;

applying at the first transmitter and the another transmitter the structured coding scheme for transmission of signals; and applying at the first transmitter and the another transmitter the prescribed delay or the prescribed advance.

11. The method of claim 10, wherein the structured coding scheme is selected from a group consisting of space-time block coding and Alamouti space-time coding.

12. The method of claim 10, further comprising intercommunicating between the first transmitter and the another transmitter to determine the structured coding scheme to use for transmission of signals.

13. The method of claim 10, further comprising intercommunicating between a central transmitter, the first transmitter and the another transmitter to determine the structured coding scheme to use for transmission of signals.

14. The method of claim 10, further comprising receiving synchronously in time at a receiver the desired signal transmitted by the first transmitter and the undesired signal transmitted by the another transmitter.

15. The method of claim 14, wherein the signals received synchronously in time each comprise a cyclic prefix and are received by the receiver within a cyclic prefix of each other.

16. The method of claim 15, further comprising receiving signals from the first transmitter and the another transmitter, and applying a mean-square-error-based interference cancellation technique to the desired signal received from the first transmitter and the undesired signal received from the another transmitter.

17. A receiver apparatus, comprising:
at least two antennae capable of receiving signals from a first transmitter and another transmitter, the signal received from the first transmitter being a desired signal and the signal received from the another transmitter being an undesired signal, the desired signal and the undesired signal using a similar coding scheme and being in synchronism as received at the receiver apparatus, and the undesired signal interfering with the desired signal;

fast Fourier transform logic capable of performing a fast Fourier transform operation on signals received by the at least two antennae; and a receiver capable of receiving signals from the fast Fourier transform logic and capable of applying a mean-square-error-based interference cancellation technique to reduce interference between the received desired signal and the received undesired signal.

18. The receiver of claim 17, wherein the desired signal and the undesired signal being in synchronism comprises being within a cyclic prefix of each other.

19. The receiver of claim 17, wherein the coding scheme is selected from a group consisting of space-time block coding and Alamouti space-time coding.

20. The receiver of claim 17, further comprising a host computer communicatively coupled to the receiver.

21. The receiver of claim 17, wherein the receiver comprises logic capable of performing one or more operations selected on at least the received desired signal from a group consisting of: equalization, de-mapping, de-interleaving, and de-scrambling.

22. An article comprising: a computer-readable non-transitory medium having stored thereon instructions that, if executed, result in at least:
storing a structured coding scheme;
storing a prescribed delay or a prescribed advance;
applying the structured coding scheme to signals that are to be transmitted to a receiver; and
applying the prescribed delay or the prescribed advance to the desired signals that are to be transmitted to the receiver so that the if the signals that are to be transmitted to the receiver are desired signals, the transmitted desired signals will be received by the receiver in synchronism with undesired signals transmitted by another transmitter and received by the receiver, and if the signals that are to be transmitted to the receiver are undesired signals, the transmitted undesired signals will be received by the receiver in synchronism with the desired signals transmitted by another receiver and received by the receiver.

23. The article of claim 22, wherein the structured coding scheme is selected from a group consisting of space-time block coding and Alamouti space-time coding.

24. The article of claim 22, wherein the prescribed delay or the prescribed advance is set so that the receiver receives codes from a desired signal and an undesired signal within a cyclic prefix of the desired signal and the undesired signal.

25. The article of claim 22, further comprising instructions that, if executed, result in at least:
intercommunicating between a transmitter transmitting the desired signal and another transmitter transmitting the undesired signal to determine the structured coding scheme, and the prescribed delay or the prescribed advance.

26. The article of claim 22, further comprising instructions that, if executed, result in at least:
intercommunicating between a transmitter transmitting the desired signal or another transmitter transmitting the undesired signal, and a receiver to determine the structured coding scheme, and the prescribed delay or the prescribed advance.

27. The article of claim 22, further comprising instructions that, if executed, result in at least:
intercommunicating between a transmitter transmitting the desired signal or another transmitter transmitting the undesired signal, and a central transmitter to determine the structured coding scheme, and the prescribed delay or the prescribed advance.

* * * * *